(12) United States Patent
Ye et al.

(10) Patent No.: US 11,067,292 B2
(45) Date of Patent: Jul. 20, 2021

(54) INTELLIGENT RANGE HOOD AND CONTROL METHOD THEREFOR

(71) Applicant: Ningbo Fotile Kitchen Ware Co., Ltd., Ningbo (CN)

(72) Inventors: Feng Ye, Ningbo (CN); Jing Zhang, Ningbo (CN); Zhaozhan Luo, Ningbo (CN); Zhixian Shen, Ningbo (CN); Zhongqun Mao, Ningbo (CN); Yongding Zhu, Ningbo (CN)

(73) Assignee: Ningbo Fotile Kitchen Ware Co., Ltd., Ningbo (CN)

( * ) Notice: Subject to any disclaimer, the term of this patent is extended or adjusted under 35 U.S.C. 154(b) by 224 days.

(21) Appl. No.: 16/474,966

(22) PCT Filed: Sep. 5, 2017

(86) PCT No.: PCT/CN2017/000560
§ 371 (c)(1),
(2) Date: Jun. 28, 2019

(87) PCT Pub. No.: WO2018/120260
PCT Pub. Date: Jul. 5, 2018

(65) Prior Publication Data
US 2019/0338960 A1    Nov. 7, 2019

(30) Foreign Application Priority Data

Dec. 29, 2016 (CN) .......................... 201611243984.1
Sep. 5, 2017 (WO) ................. PCT/CN2017/000560

(51) Int. Cl.
*F24C 15/20* (2006.01)

(52) U.S. Cl.
CPC ...... *F24C 15/2042* (2013.01); *F24C 15/2092* (2013.01)

(58) Field of Classification Search
CPC .................... F24C 15/2042; F24C 15/2092
(Continued)

(56) References Cited

U.S. PATENT DOCUMENTS 3,247,776 A * 4/1966 Gaylord .............. F24F 13/1426
126/299 E
3,611,909 A * 10/1971 Gaylord .............. F24C 15/2021
126/299 E
(Continued)

*Primary Examiner* — Avinash A Savani
(74) *Attorney, Agent, or Firm* — Wang Law Firm, Inc.

(57) ABSTRACT

The present invention discloses an intelligent range hood and a control method thereof, which comprises a housing, a fan (4), a smoke collecting hood (3), a smoke guide plate (6), a controller and a sensor (8) for detecting concentration of smoke and/or vapor inside or outside the housing. The sensor (8) outputs an electrical signal to the controller; and, the controller controls rotation speed of the fan motor (5) and position of the smoke guide plate (6) according to the signal received from the sensor (8). The controller not only can automatically adjust the rotation speed of the fan motor (5) so as to allow the air volume of the fan (4) to adapt to the working condition of the range hood in real time, but also can adjust the air inlet area and the distance between the negative pressure region and the smoke source by moving the smoke guide plate (6) up and down, so as to adapt the change in the working condition.

10 Claims, 9 Drawing Sheets

(58) Field of Classification Search
 USPC .............................. 126/299 D, 299 E, 299 R
 See application file for complete search history.

(56) References Cited

U.S. PATENT DOCUMENTS

| | | | | |
|---|---|---|---|---|
| 5,279,279 A | * | 1/1994 | White | F24C 15/2042 |
| | | | | 126/214 D |
| 2005/0224069 A1 | * | 10/2005 | Patil | F24C 15/2021 |
| | | | | 126/299 D |
| 2008/0274683 A1 | * | 11/2008 | Burdett | F24C 15/2042 |
| | | | | 454/61 |
| 2011/0284091 A1 | * | 11/2011 | Livchak | F24F 7/06 |
| | | | | 137/2 |
| 2014/0127987 A1 | * | 5/2014 | Cheung | F24F 11/0001 |
| | | | | 454/347 |
| 2014/0174429 A1 | * | 6/2014 | Fuhge | F24C 15/2021 |
| | | | | 126/299 D |
| 2015/0192305 A1 | * | 7/2015 | Graw | F24C 15/2042 |
| | | | | 126/299 D |
| 2015/0211748 A1 | * | 7/2015 | Robison | F24C 15/2021 |
| | | | | 454/340 |
| 2017/0016630 A1 | * | 1/2017 | Yang | F24C 15/2042 |

* cited by examiner

US 11,067,292 B2

INTELLIGENT RANGE HOOD AND CONTROL METHOD THEREFOR

RELATED APPLICATIONS

This application is a national phase entrance of and claims benefit to PCT Application for an intelligent range hood and a control method thereof, PCT/CN2017/000560, filed on Sep. 5, 2017, which claims benefit to Chinese Patent Applications 201611243984.1, filed on Dec. 29, 2016. The specifications of both applications are incorporated here by this reference.

FIELD OF THE INVENTION

The present invention relates to a range hood and in particular to an intelligent range hood and a control method thereof.

DESCRIPTION OF THE PRIOR ART

Existing range hoods are generally equipped with a two-level or three-level air volume key. Once the rotation speed of the motor has been set, the motor will not adjust the air volume and air pressure of the range hood according to the actual kitchen environment or cooking method to allow the range hood to always adapt to and operate in the most appropriate working state. Meanwhile, smoke and vapor generated during the cooking process will change over time, but the existing range hoods will not actively detect this change and cannot adjust the rotation speed of the motor over time to change the air volume to adapt to this change, and the rotation speed of the motor can only be manually switched by a key. Therefore, it is inconvenient to operate, and it is not energy-saving and environmental-friendly. For example, in Chinese Patent No. CN 102538046 B (Patent No. 201210036643.2) entitled A RANGE HOOD WITH AN ADAPTIVELY-ADJUSTABLE FAN ROTATION SPEED, this range hood can adjust, according to only the resistance at the air outlet, the rotation speed of the fan to compensate for the air volume, but cannot adjust the motor output according to the concentration of smoke and vapor at the air outlet.

In addition, range hoods with smoke guide plates have been disclosed in the prior art. For example, in Chinese Patent Application No. CN 105423395 A (Application No. 201610029797.7) entitled A EUROPEAN-STYLE RANGE HOOD WITH AN AUTOMATIC SMOKE GUIDE PLATE, the smoke guide plate of this range hood is moved up and down only when the range hood is activated and deactivated. When the range hood is activated, the smoke guide plate is moved down, and the air inlet of the range hood is opened; and, when the range hood is deactivated, the smoke guide plate is moved up, and the air inlet of the range hood is closed. It can be known that the change in the working condition of the range hood is not taken into consideration during the lifting motion of the smoke guide plate of the range hood, that is, the lifting position of the smoke guide plate cannot be adjusted in real time according to the concentration of smoke and vapor. Thus, the adjustment function of the smoke guide plate is relatively single. In addition, since the smoke guide plate driving mechanism of the range hood does not consider the pollution from the smoke environment, after long-term use, each component of the driving mechanism is easily stained with oil dirt, so that the kinetic friction between components is increased, and the smoke guide plate is difficult to smoothly move up and down. Moreover, the service life of the driving mechanism will also be reduced.

SUMMARY OF THE INVENTION

A first technical problem to be solved by the present invention is to provide an intelligent range hood which can automatically adjust the air volume, the air inlet area and the distance between a negative pressure region and a smoke source according to the concentration of smoke and vapor.

A second technical problem to be solved by the present invention is to provide a method for controlling an intelligent range hood which enables the rotation speed of a fan and the position of a smoke guide plate to automatically adapt to the working condition of the range hood.

To solve the first technical problem, the intelligent range hood comprises an housing, a fan having an air inlet disposed inside the housing, a fan motor disposed inside the housing and connected to the fan, a smoke collecting hood located below the housing, and a smoke guide plate located below the smoke collecting hood, a push rod mechanism for driving the smoke guide plate to move up and down disposed inside the housing, a controller and a senor for detecting concentration of smoke and/or vapor inside or outside the housing; wherein the fan is driven by the fan motor, the sensor outputs an electrical signal to the controller; and, the controller controls rotation speed of the fan motor and position of the smoke guide plate according to the signal received from the sensor.

Preferably, the housing comprises an outer fan hood disposed outside the fan and a decorative hood disposed outside the outer fan hood.

To sense the concentration of smoke and vapor inside the range hood, the sensor is disposed inside the outer fan hood and adjacent to the air inlet of the fan.

To sense the concentration of the escaped smoke and vapor, the sensor is disposed outside the decorative hood and the smoke collecting smoke. In this way, the operating air volume of the range hood and the height of the smoke guide plate can be automatically adjusted by detecting the escape of the smoke and vapor.

Preferably, when the smoke guide plate moves up to the highest position, an air inlet of the range hood is closed by the smoke guide plate. In this way, the cleanness of the range hood can be improved, and the range hood is allowed to have a certain function of preventing smoke from tinting odor.

To improve the smoke suction effect, the smoke guide plate is slanted downwardly from front to rear at an inclination angle $\alpha$ between 5° to 30°.

Further, preferably, when the smoke guide plate moves down to the lowest position, a vertical distance d from a front side edge of the smoke guide plate to a lower edge of the smoke collecting hood is between 0 mm to 300 mm.

As a preferred implementation of any one of the above solutions, a mounting chamber isolated from smoke is formed between the decorative hood and the outer fan hood, the driving mechanism is disposed inside the mounting chamber, and an output end of the driving mechanism passes downward through the smoke collecting hood and is engaged with the smoke guide plate. In this way, the driving mechanism can be ensured to always be in a non-smoke environment, it is smoother to drive the smoke guide plate to move, and the service life of the driving mechanism can be prolonged.

To enable the driving mechanism to smoothly drive the smoke guide plate to move up and down, preferably, the outer fan hood has two side plates and a front plate; the driving mechanism comprises a driving motor, a push rod mechanism, a connecting plate, two slide rods with a top and a bottom, and two guide rails; the push rod mechanism is disposed on the middle of the front plate of the outer fan hood and driven by the driving motor; two slide rods are respectively located at the left and right sides of the outer fan hood, and each slide rod passes through the smoke collecting hood; the bottom of each slide rod is attached to the smoke guide plate, while the top of each slide rod is attached to the connecting plate; two guide rails are vertically disposed on the two side plates of the outer fan hood, respectively; and, the push rod mechanism drives the connecting plate to move up and down along the guide rails, so that the slide rods and the smoke guide plate are driven to move up and down together.

To prevent the push rod mechanism from generating noise and jitter during its operation process, preferably, the push rod mechanism comprises a screw rod, a first nut, a second nut and a spring; the screw rod is vertically arranged and driven to rotate by the driving motor; the first nut and the second nut are successively mounted on the screw rod from the top down; the spring is sheathed on the screw rod and disposed between the first nut and the second nut; and the spring applies a vertical upward elastic force to the first nut, so that the first nut is prevented from colliding with the screw rod during its movement due to the fit clearance between the first nut and the screw rod.

To allow the push rod mechanism to be in the optimal operating state, the first nut is used for mounting a load, the spring applies a vertical upward elastic force F' to the first nut, the gravity of the first nut and a component force of the friction between the first nut and the screw rod in a vertical downward direction form a resultant force F, and the magnitude of the elastic force F' and the magnitude of the resultant force F satisfy the following condition: F'=F.

To solve the second technical problem, the present invention employs the following technical solutions. The method for controlling an intelligent range hood comprises the following steps:

(1) the range hood is activated, and the controller allows the smoke guide plate and the fan motor to operate in an initial state;

(2) the sensor begins to detect the concentration of smoke and vapor, and the controller calculates a target state of the smoke guide plate and the fan motor according to the concentration value;

(3) the controller detects the current state of the smoke guide plate; if the smoke guide plate is not located at the target position, the smoke guide plate driving module adjusts the position of the smoke guide plate so that the smoke guide plate is moved to the target position; and, if the smoke guide plate is already located at the target position, the position of the smoke guide plate will not be adjusted; and (4) the controller detects the current operating state of the fan motor; if the fan motor does not operate in the target state, the fan motor is adjusted to operate to the target state by the motor driving module; and, if the fan motor already operates in the target state, the rotation speed of the fan motor will not be adjusted.

Compared with the prior art, the present invention has the following advantages. In the intelligent range hood, by providing the sensor and the controller, the sensor can sense the concentration of smoke and/or vapor inside or outside the housing; and the controller not only can automatically adjust the rotation speed of the fan motor according to the received output signal from the sensor so as to allow the air volume of the fan to adapt to the working condition of the range hood in real time, but also can automatically adjust the air inlet area and the distance between the negative pressure region and the smoke source by moving the smoke guide plate up and down, so as to adapt the change in the working condition.

DETAILED DESCRIPTION OF THE PREFERRED EMBODIMENT

Figure 1:
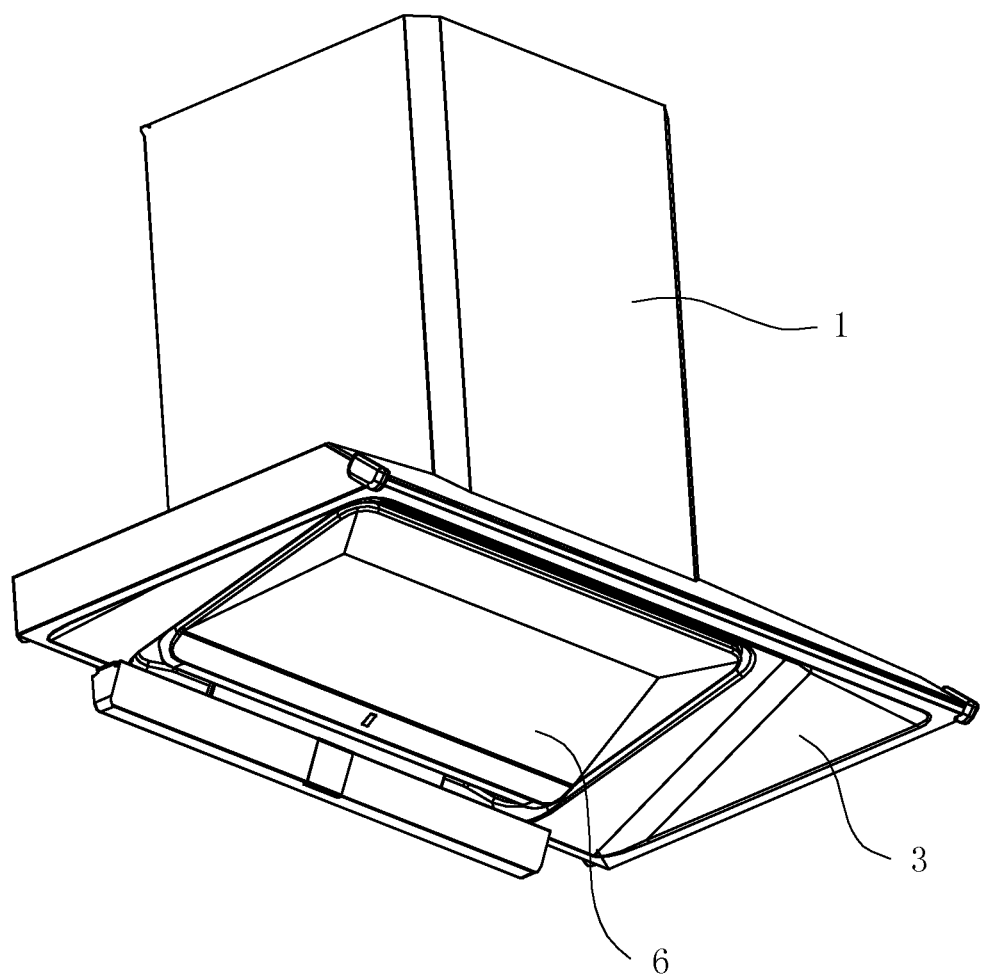
FIG. 1 is a perspective view of an intelligent range hood according to an embodiment of the present invention.
Figure 2:
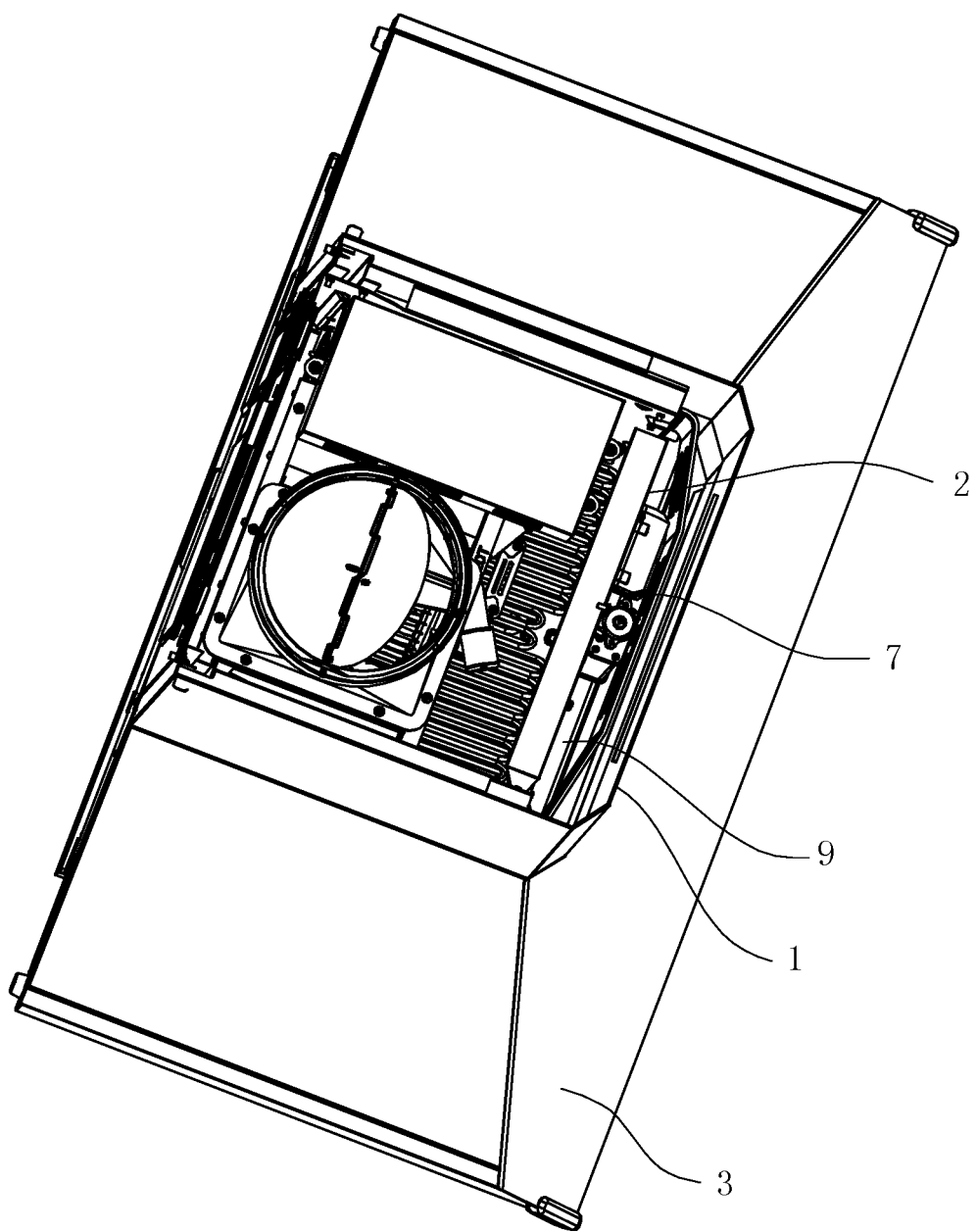
FIG. 2 is a perspective view of the intelligent range hood according to the embodiment of the present invention, when viewed from another perspective.
Figure 3:
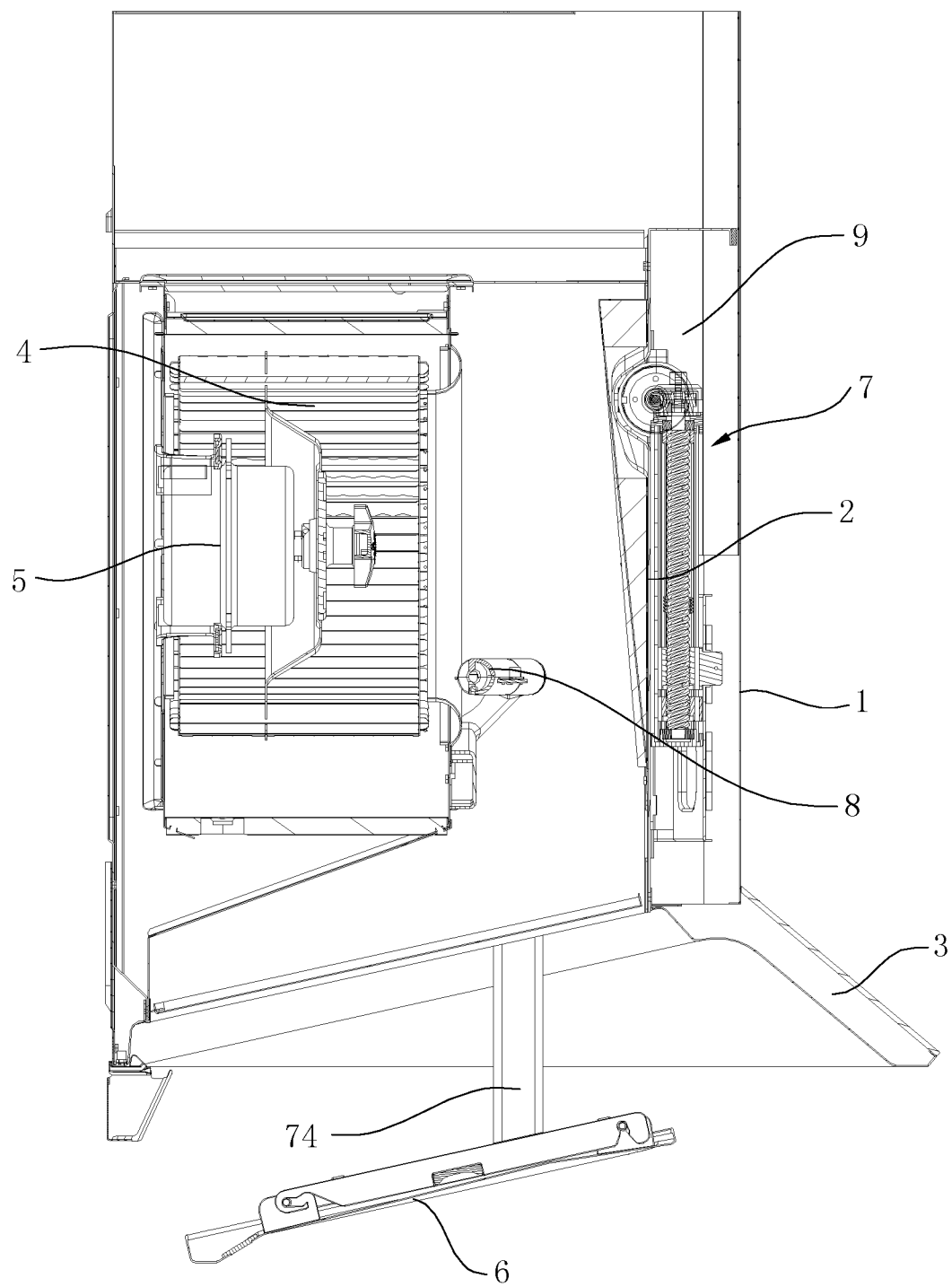
FIG. 3 is a perspective view of the intelligent range hood according to the embodiment of the present invention when a smoke guide plate is in a descending state.
Figure 4:
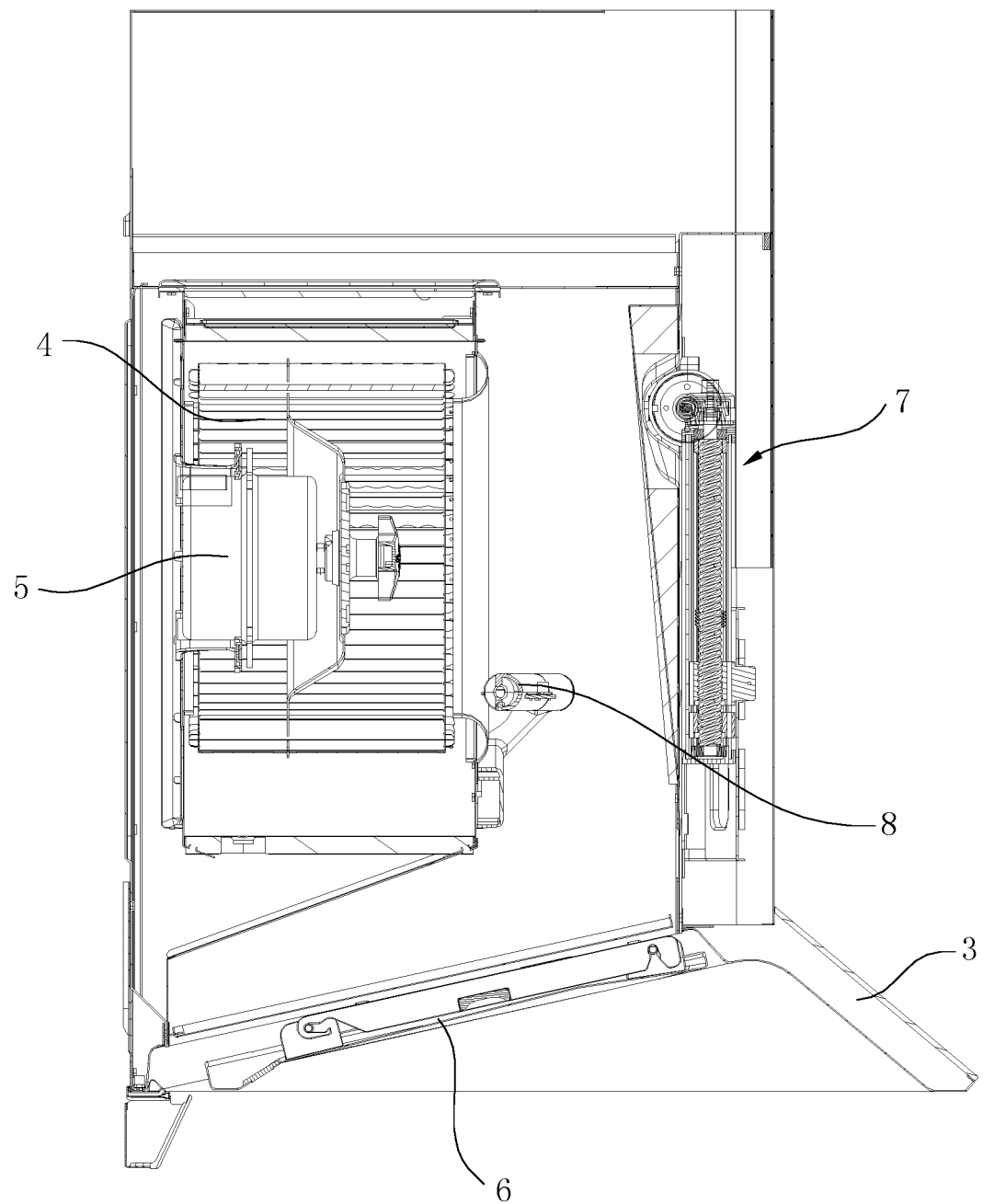
FIG. 4 is a perspective view of the intelligent range hood according to the embodiment of the present invention when the smoke guide plate is in an ascending state.
Figure 5:
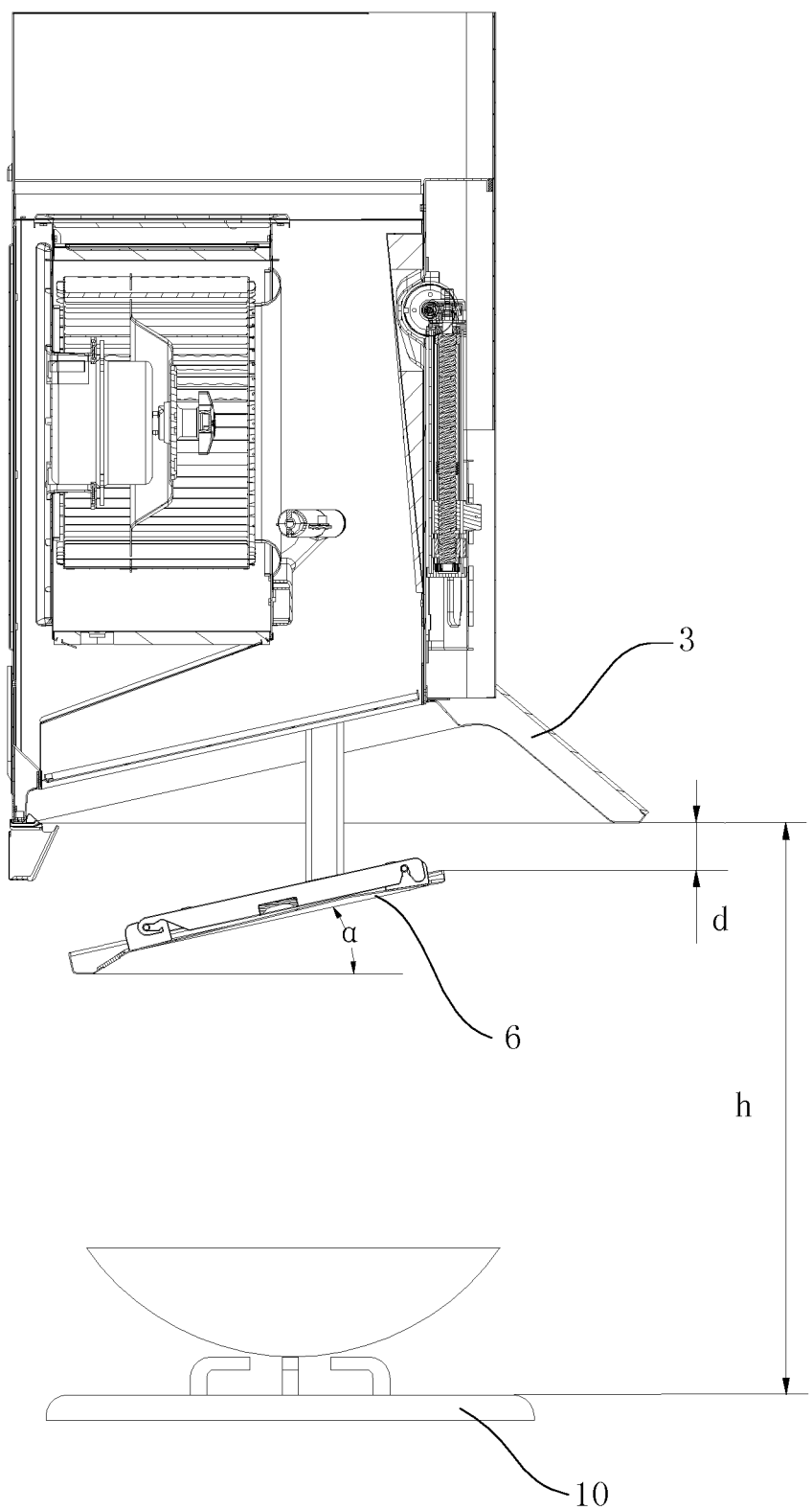
FIG. 5 is a perspective view of the intelligent range hood according to the embodiment of the present invention when in use.

To enable a further understanding of the present invention content of the invention herein, refer to the detailed description of the invention and the accompanying drawings below:

As shown in FIGS. 1-5, in this embodiment, the intelligent range hood comprises a decorative hood 1, an outer fan hood 2, a smoke collecting hood 3, a fan 4 having an air inlet, a fan motor 5, a smoke guide plate 6, a driving mechanism 7, a sensor 8, a controller and other components.

The decorative hood 1 and the outer fan hood 2 form a housing of the range hood. The outer fan hood 2 is disposed inside the decorative hood 1, and the smoke collecting hood 3 is located below the decorative hood 1. The fan 4 is driven by the fan motor 5. Both the fan 4 and the fan motor 5 are disposed inside the outer fan hood 2. The smoke guide plate 6 is located below the smoke collecting hood 3. The driving mechanism 7 for driving the smoke guide plate 6 to move up and down is disposed inside the housing. The sensor 8 is disposed inside the outer fan hood 2 and adjacent to the air inlet of the fan. The controller is disposed on a power panel (not shown in the FIGS.) of the range hood. The sensor 8 outputs an electrical signal to the controller. During the operation of the range hood, the sensor 8 detects the concentration of smoke and vapor at the air inlet of the fan, and the controller correspondingly adjusts the rotation speed of the fan motor 5 and the position of the smoke guide plate 6 according to the signal received from the sensor 8. After the rotation speed of the fan motor 5 is adjusted, the air volume of the fan is correspondingly changed; and after the lifting position of the smoke guide plate 6 is changed, the air inlet and the distance between a negative pressure region and a smoke source are correspondingly changed.

When the smoke guide plate 6 moves up to the highest position, an air inlet of the range hood is closed by the smoke guide plate 6, so that the cleanness of the range hood is effectively improved and the range hood is allowed to have a certain function of preventing smoke from tinting odor. When the smoke guide plate 6 moves down to the lowest position, a vertical distance d from a front side edge of the smoke guide plate 6 to a lower edge of the smoke collecting hood 3 is between 0 mm to 300 mm. Conventionally, after the range hood is mounted, a distance h from a lower edge of the smoke collecting hood 3 to a stove 10 is between 650 mm to 700 mm. In addition, to achieve the best smoke suction effect, in this embodiment, the smoke plate 6 is slanted downwardly from front to rear at an inclination angle between 5° to 30°.

In order to isolate the driving mechanism 7 from the smoke, in this embodiment, a mounting chamber 9 isolated from smoke is formed between the decorative hood 1 and the outer fan hood 2, the driving mechanism 7 is disposed inside the mounting chamber 9, and an output end of the driving mechanism 7 passes downward through the smoke collecting hood 3 and is engaged with the smoke guide plate 6. In this way, the driving mechanism 7 can be ensured to always in a non-smoke environment, it is smoother to drive the smoke guide plate to move, and the service life of the driving mechanism can be prolonged.

Figure 6:
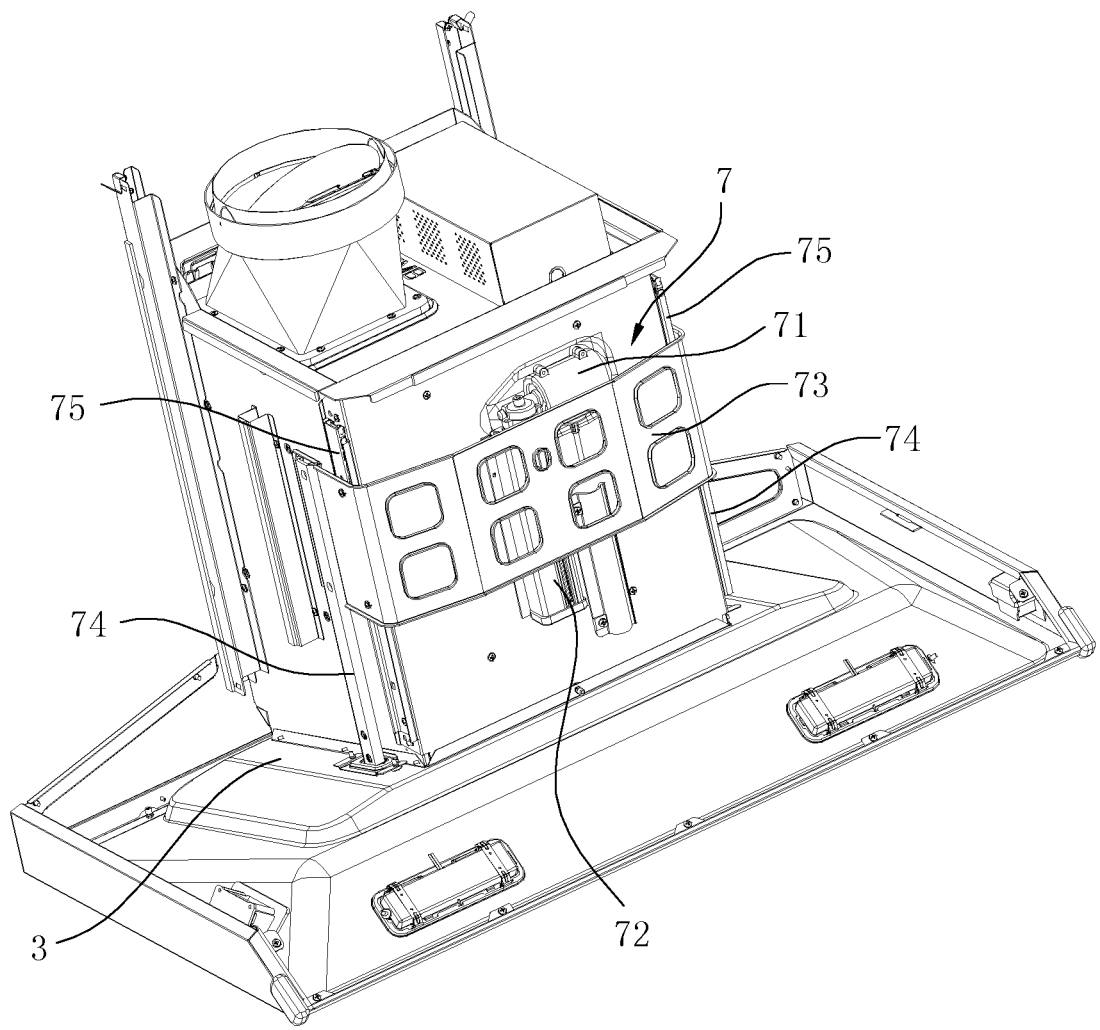
FIG. 6 is a perspective view of the intelligent range hood according to the embodiment of the present invention after a decorative hood is removed.
Figure 7:
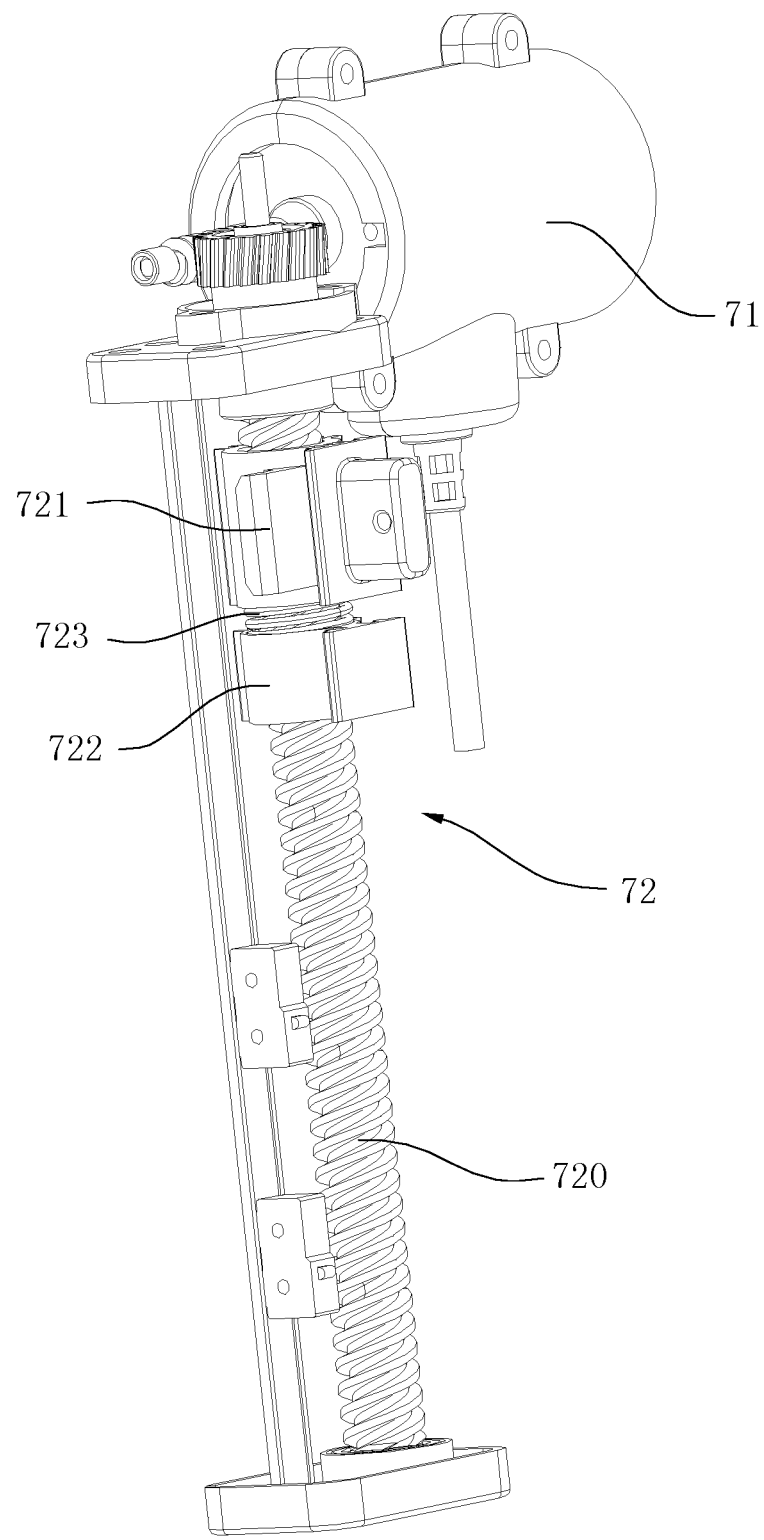
FIG. 7 is a perspective view of the intelligent range hood according to a driving motor and a push rod mechanism according to the embodiment of the present invention.
Figure 8:
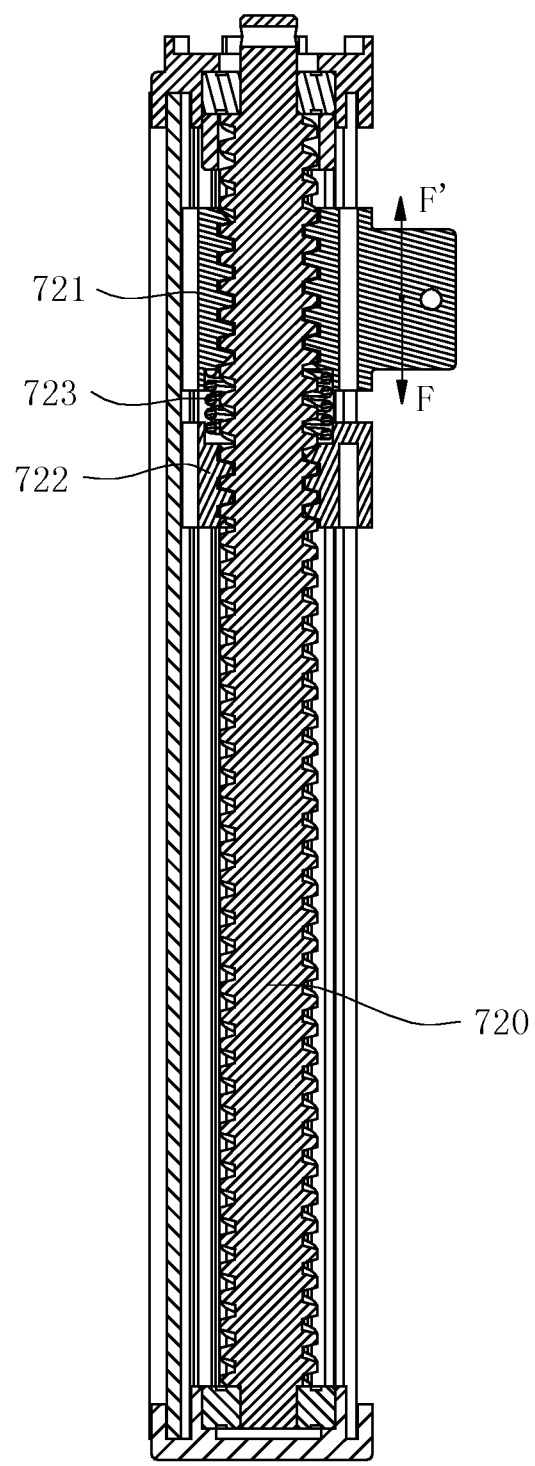
FIG. 8 is a sectional view of the intelligent range hood according to the push rod mechanism according to the embodiment of the present invention.

As shown in FIGS. 6-8, in this embodiment, outer fan hood 2 has two side plates and a front plate; the driving mechanism 7 comprises a driving motor 71, a push rod mechanism 72, a connecting plate 73, two slide rods 74 with a top and a bottom, and two guide rails 75. The push rod mechanism 72 is disposed on the middle of the front plate of the outer fan hood 2 and driven by the driving motor 71. Two slide rods 74 are respectively located at the left and right sides of the outer fan hood 2, and each slide rod 74 passes through the smoke collecting hood 3. The bottom of each slide rod 74 is attached to the smoke guide plate 6, while the top of each slide rod 74 is attached to the connecting plate 73. Two guide rails 75 are vertically disposed on the two side plates of the outer fan hood 2, respectively. The push rod mechanism 72 drives the connecting plate to move up and down along the guide rails 75, so that the slide rods 74 and the smoke guide plate 6 are allowed to move up and down together. The driving mechanism provides power for lifting motion by the push rod mechanism 72 in the middle of a mounting frame, and transfers the power to two sides by the connecting plate 73. The guide rails 75 on both sides ensure the vertical and stable motion, and the slide rods 74 further transfers the motion downward to the smoke guide plate 6, so that the lifting motion of the smoke guide plate 6 is very stable.

In this embodiment, the push rod mechanism 72 is of a screw-rod nut mechanism. The push rod mechanism comprises a screw rod 720, a first nut 721, a second nut 722 and a spring 723. The screw rod 720 is vertically arranged and driven to rotate by the driving motor 71. The first nut 721 and the second nut 722 are successively mounted on the screw rod 720 from the top down. The spring 723 is sheathed on the screw rod 720 and disposed between the first nut 721 and the second nut 722. The spring 723 applies a vertical upward elastic force to the first nut 721, so that the first nut 721 is prevented from colliding with the screw rod during its movement due to the fit clearance between the first nut and the screw rod 720.

The connecting plate 73 is disposed on the first nut 721. The connecting plate 73, the slide rods 74 and the smoke guide plate 6 form a load. The gravity of the load, the gravity of the first nut 721 and a component force of the friction between the first nut and the screw rod in a vertical downward direction form a resultant force F. The spring 723 applies a vertical upward elastic force F' to the first nut 721.

Two situations of the downward movement and upward movement of the first nu 721 will be analyzed below.

(1) The first nut 721 is driven to move downward at a constant speed by the rotation of the screw rod 720.

When $0 \leq F' < F$ and when the first nut 721 is exactly moved to a position with a clearance, the direction of the resultant force of F' and F is downward and is the same as the direction of motion of the first nut 721. At this time, the first nut 721 will be weightless temporarily, and the downward acceleration will increase the movement speed of the first nut 721. Then, the first nut impacts a lower interface of the clearance so as to generate impact noise. This situation will generally occur periodically with the rotation of the screw rod 720.

When $F' \geq F$, the direction of the resultant force of F' and F is upward and is opposite to the direction of motion of the first nut 721. At this time, the first nut 721 will not be weightless, and the mechanism will not generate any noise and jitter during its movement.

(2) The first nut 721 is driven to move up at a constant speed by the rotation of the screw rod 720.

When $0 \leq F' \leq F$, the direction of the resultant force of F' and F is downward and is opposite to the direction of motion of the first nut 721. At this time, the first nut 721 will not be weightless, and the mechanism will not generate any noise and jitter during its movement.

When $F' > F$ and when the first nut 721 is exactly moved to a position with a clearance, the direction of the resultant force of F' and F is upward and is the same as the direction of motion of the first nut 721. At this time, the first nut 721 will be weightless temporarily, and the mechanism will generate noise and jitter during its movement.

It can be known from the two motion processes of the first nut 721 that, when the condition of $F'=F$ is satisfied, the first nut 721 can be prevented from colliding with the screw rod during its upward or downward movement due to the fit clearance between the first nut and the screw rod 720, and the screw-rod nut mechanism is further prevented from generating noise and jitter during the operation process.

After the intelligent mode of the range hood is started, the fan motor 5 begins to operate in an initial state, the smoke guide plate 6 is located at an initial position, and the sensor 8 begins to detect the concentration of smoke and vapor and then obtains a target operation parameter of the fan motor 5 and a target height of the smoke guide plate 6 according to the concentration of smoke and vapor. Subsequently, the controller drives the fan motor 5 to operate in the target state through the motor driving module. Meanwhile, the controller determines whether the smoke guide plate is located at the target height position. If the smoke guide plate is already located at the target height position, the smoke guide plate will not be adjusted; and, if the smoke guide plate is not located at the target height position, the smoke guide plate is moved up to the target height position.

Figure 9:
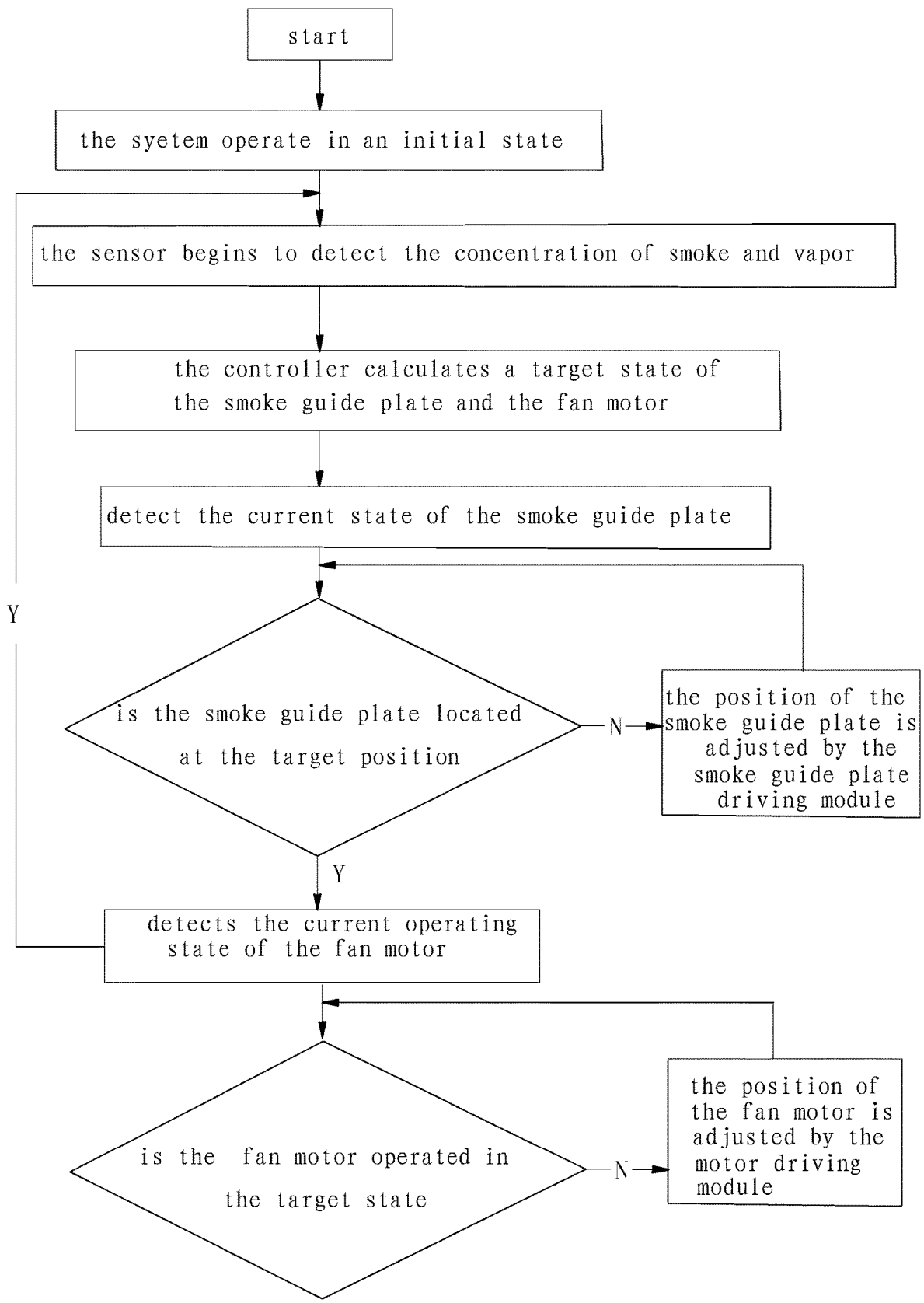
FIG. 9 is a control flowchart of the intelligent range hood according to the embodiment of the present invention.

As shown in FIG. 9, after the intelligent mode of the range hood is activated, the controller allows the smoke guide plate and the fan motor to operate in the initial state, the sensor begins to detect the concentration of smoke and vapor, and the controller calculates a target state of the smoke guide plate and the fan motor according to the concentration value. Subsequently, the controller detects the current state of the smoke guide plate. If the smoke guide plate is not located at the target position, the smoke guide plate driving module adjusts the position of the smoke guide plate, so that the smoke guide plate is moved to the target position. If the smoke guide plate is already located at the target position, the controller detects the current operating state of the fan motor; if the fan motor does not operate in the target state, the fan motor is adjusted to the target state by the motor driving module; and, if the fan motor already operates in the target state, the whole closed loop process is completed.

Of course, it is possible that the state of the fan motor is determined and adjusted and the smoke guide plate is then determined and adjusted.

The foregoing description merely shoes the preferred implementations of the present invention. It should be pointed out that various transformations or improvements can be made to the present invention by a person of ordinary skill in the art without departing from the principle of the present invention. For example, the sensor can be mounted outside the range hood, for example, being mounted outside the decorative hood and the smoke collecting hood, so that the operating air volume of the range hood and the height of the smoke guide plate are adjusted by sensing the escape of the smoke and vapor. Those transformations or improvements shall fall into the protection scope of the present invention.

The invention claimed is:

1. An intelligent range hood, comprising
a housing;
a fan (4) having an air inlet disposed inside the housing;
a fan motor (5) disposed inside the housing and connected to the fan (4);
a smoke collecting hood (3) located below the housing;
a smoke guide plate (6) located below the smoke collecting hood (3);
a push rod mechanism for driving the smoke guide plate (6) to move up and down disposed inside the housing;
a controller; and,
a sensor (8) for detecting concentration of smoke and/or vapor inside or outside the housing;
wherein
the housing comprises an outer fan hood (2) disposed outside the fan (4) and a decorative hood (1) disposed outside the outer fan hood (2);
the fan (4) is driven by the fan motor (5);
the sensor (8) outputs an electrical signal to the controller; and,
the controller controls rotation speed of the fan motor (5) and position of the smoke guide plate (6) according to the signal received from the sensor (8).

2. The range hood of claim 1, wherein the sensor (8) is disposed inside the outer fan hood (2) and adjacent to the air inlet of the fan (4).

3. The range hood of claim 1, wherein the sensor (8) is disposed outside the decorative hood (1) and the smoke collecting hood (3).

4. The range hood of claim 1, wherein when the smoke guide plate (6) moves up to the highest position, an air inlet of the range hood is closed by the smoke guide plate (6).

5. The range hood of claim 1, wherein the smoke guide plate (6) is slanted downwardly from front to rear at an inclination angle (a) between 5° to 30°.

6. The range hood of claim 5, wherein when the smoke guide plate (6) moves down to the lowest position, a vertical distance (d) from a front side edge of the smoke guide plate (6) to a lower edge of the smoke collecting hood (3) is between 0 mm to 300 mm.

7. The range hood of claim 1, wherein a mounting chamber (9) isolated from smoke is formed between the decorative hood (1) and the outer fan hood (2);
the driving mechanism (7) is disposed inside the mounting chamber (9); and,
an output end of the driving mechanism (7) passes downward through the smoke collecting hood (3) and is engaged with the smoke guide plate (6).

8. The range hood of claim 7, wherein the outer fan hood (2) has two side plates and a front plate;
the driving mechanism (7) comprises a driving motor (71), a push rod mechanism (72), a connecting plate (73), two slide rods (74) with a top and a bottom, and two guide rails (75);
the push rod mechanism (72) is disposed on the middle of the front plate of the outer fan hood (2) and driven by the driving motor (71);
two slide rods (74) are respectively located at the left and right sides of the outer fan hood (2), and each slide rod (74) passes through the smoke collecting hood (3);
the bottom of each slide rod (74) is attached to the smoke guide plate (6), while the top of each slide rod (74) is attached to the connecting plate (73);
two guide rails (75) are vertically disposed on the two side plates of the outer fan hood (2), respectively; and,
the push rod mechanism (72) drives the connecting plate (73) to move up and down along the guide rails (75), so that the slide rods (74) and the smoke guide plate (6) are driven to move up and down together.

9. The range hood of claim 8, wherein the push rod mechanism (72) comprises a screw rod (720), a first nut (721), a second nut (722) and a spring (723);
the screw rod (720) is vertically arranged and driven to rotate by the driving motor (71);
the first nut (721) and the second nut (722) are successively mounted on the screw rod (720) from the top down;
the spring (723) is sheathed on the screw rod (720) and disposed between the first nut (721) and the second nut (722); and,
the spring (723) applies a vertical upward elastic force to the first nut (721), so that the first nut (721) is prevented from colliding with the screw rod (720) during its movement due to the fit clearance between the first nut (721) and the screw rod (720).

10. A method for controlling the range hood of anyone of claim 1, wherein the method comprises the following steps:
(1) the range hood is activated, and the controller allows the smoke guide plate and the fan motor to operate in an initial state;
(2) the sensor begins to detect the concentration of smoke and vapor, and the controller calculates a target state of the smoke guide plate and the fan motor according to the concentration value;
(3) the controller detects the current state of the smoke guide plate; if the smoke guide plate is not located at the target position, the smoke guide plate driving module adjusts the position of the smoke guide plate so that the smoke guide plate is moved to the target position; and, if the smoke guide plate is already located at the target position, the position of the smoke guide plate will not be adjusted; and
(4) the controller detects the current operating state of the fan motor; if the fan motor does not operate in the target state, the fan motor is adjusted to operate to the target state by the motor driving module; and, if the fan motor already operates in the target state, the rotation speed of the fan motor will not be adjusted.

* * * * *